(12) United States Patent
Sonoda et al.

(10) Patent No.: US 8,192,154 B2
(45) Date of Patent: Jun. 5, 2012

(54) SHAPE OF GAS PASSAGE IN AXIAL-FLOW GAS TURBINE ENGINE

(75) Inventors: Toyotaka Sonoda, Saitama (JP); Martina Hasenjaeger, Offenbach (DE)

(73) Assignee: Honda Motor Co., Ltd., Tokyo (JP)

( * ) Notice: Subject to any disclaimer, the term of this patent is extended or adjusted under 35 U.S.C. 154(b) by 1103 days.

(21) Appl. No.: 12/103,503

(22) Filed: Apr. 15, 2008

(65) Prior Publication Data

US 2009/0035130 A1    Feb. 5, 2009

(30) Foreign Application Priority Data

Apr. 27, 2007    (DE) .......................... 10 2007 020 025

(51) Int. Cl.
*F01D 9/04*    (2006.01)

(52) U.S. Cl. ................. 415/191; 415/208.2; 416/223 R; 416/DIG. 2

(58) Field of Classification Search .................. 415/184, 415/191, 208.2; 416/223 R, DIG. 2
See application file for complete search history.

(56) References Cited

U.S. PATENT DOCUMENTS

| | | | |
|---|---|---|---|
| 2,846,137 A | 8/1958 | Smith | |
| 3,529,631 A | 9/1970 | Roillet | |
| 4,194,869 A | 3/1980 | Corcokios | |
| 4,720,236 A | 1/1988 | Stevens | |
| 5,149,250 A | 9/1992 | Plemmons et al. | |
| 5,466,123 A | 11/1995 | Rose | |
| 6,017,186 A | 1/2000 | Hoeger et al. | |
| 6,126,394 A | 10/2000 | Matsuda | |
| 6,283,713 B1 | 9/2001 | Harvey et al. | |
| 6,561,761 B1 | 5/2003 | Decker et al. | |
| 6,669,445 B2 | 12/2003 | Staubach et al. | |
| 6,705,834 B1 | 3/2004 | Jacobsson | |
| 6,837,679 B2 | 1/2005 | Kawarada et al. | |
| 7,011,495 B2 | 3/2006 | Guemmer | |
| 7,354,243 B2 * | 4/2008 | Harvey | 415/191 |
| 7,510,371 B2 * | 3/2009 | Orlando et al. | 415/191 |
| 7,690,890 B2 * | 4/2010 | Aotsuka et al. | 415/191 |
| 2006/0275112 A1 | 12/2006 | Lee et al. | |

FOREIGN PATENT DOCUMENTS

| | | |
|---|---|---|
| EP | 0943784 A1 | 9/1999 |
| FR | 1442526 A | 6/1966 |
| GB | 2281356 A | 3/1995 |
| JP | 61-157703 A | 7/1986 |
| JP | 5-156967 A | 6/1993 |
| JP | 10-184304 A | 7/1998 |
| JP | 2003-517130 A | 5/2003 |

* cited by examiner

*Primary Examiner* — Edward Look
*Assistant Examiner* — Liam McDowell
(74) *Attorney, Agent, or Firm* — Birch, Stewart, Kolasch & Birch, LLP

(57) ABSTRACT

An axial-flow gas turbine engine includes a plurality of inlet guide vanes (V) which are radially disposed in an annular gas passage defined between an inner peripheral wall (Ch) and an outer peripheral wall (Ct) of a turbine. The inner peripheral wall (Ch) of the gas passage includes inner peripheral concave portions (Cc1 and Cc3) on an upstream side, and inner peripheral convex portions (Cv1 and Cv3) on a downstream side. The outer peripheral wall (Ct) of the gas passage includes outer peripheral convex portions (Cv2 and Cv4) on an upstream side, and outer peripheral concave portions (Cc2 and Cc4) on a downstream side. Therefore, a pressure difference in a radial direction of the inlet guide vane V is reduced or partially reversed, and a secondary flow toward an inner side in the radial direction can be suppressed to reduce pressure loss.

15 Claims, 7 Drawing Sheets

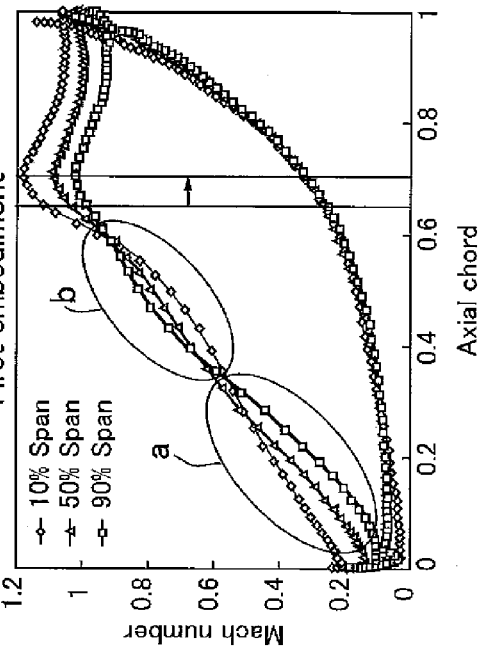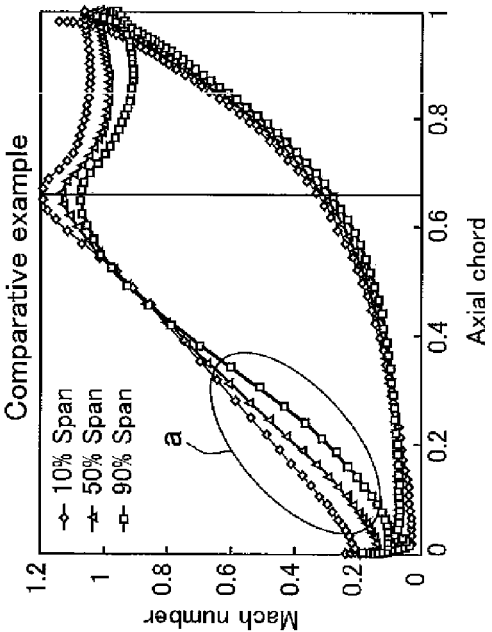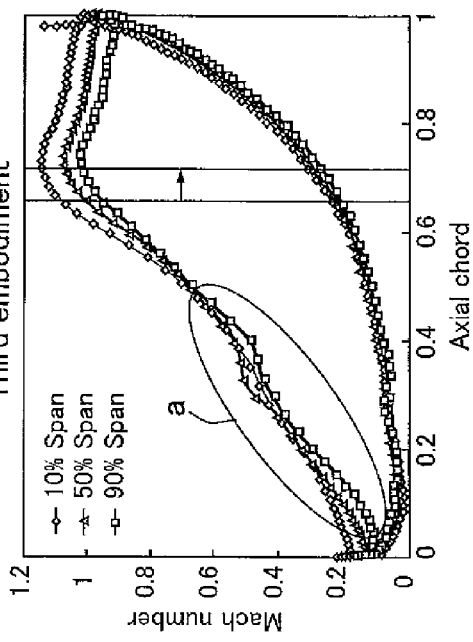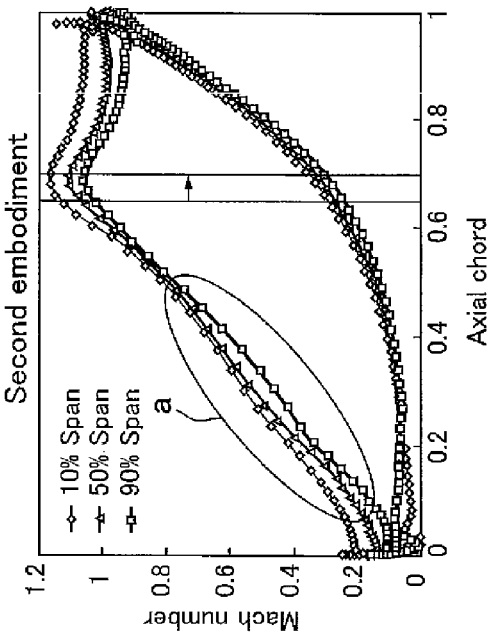

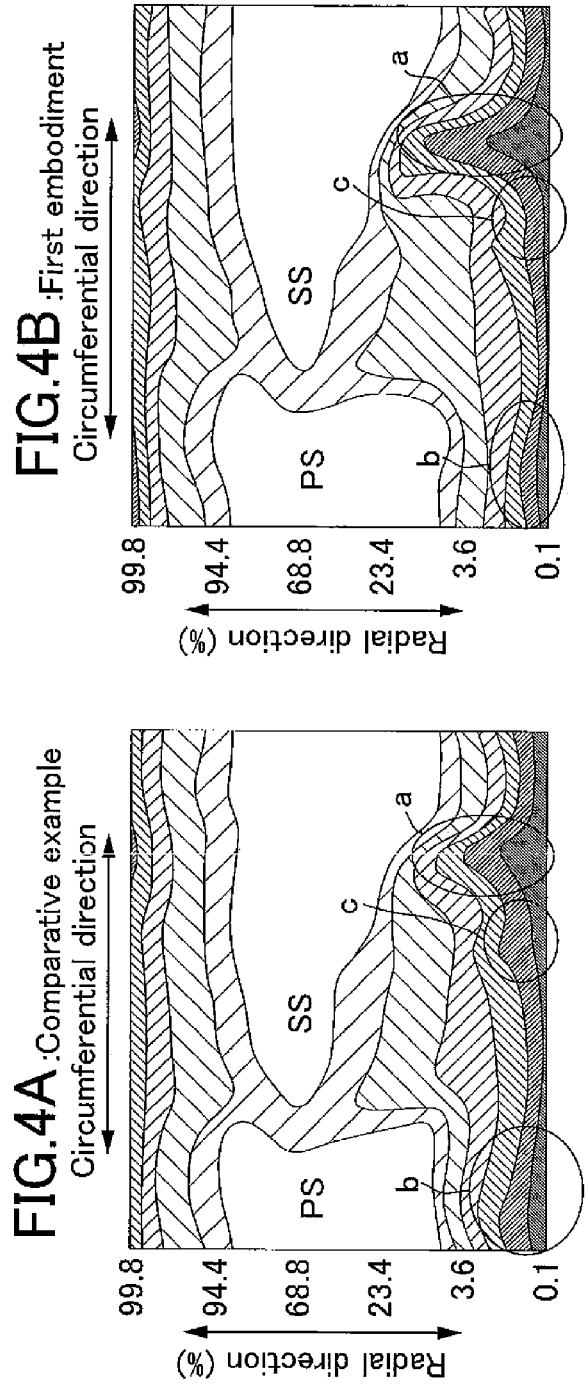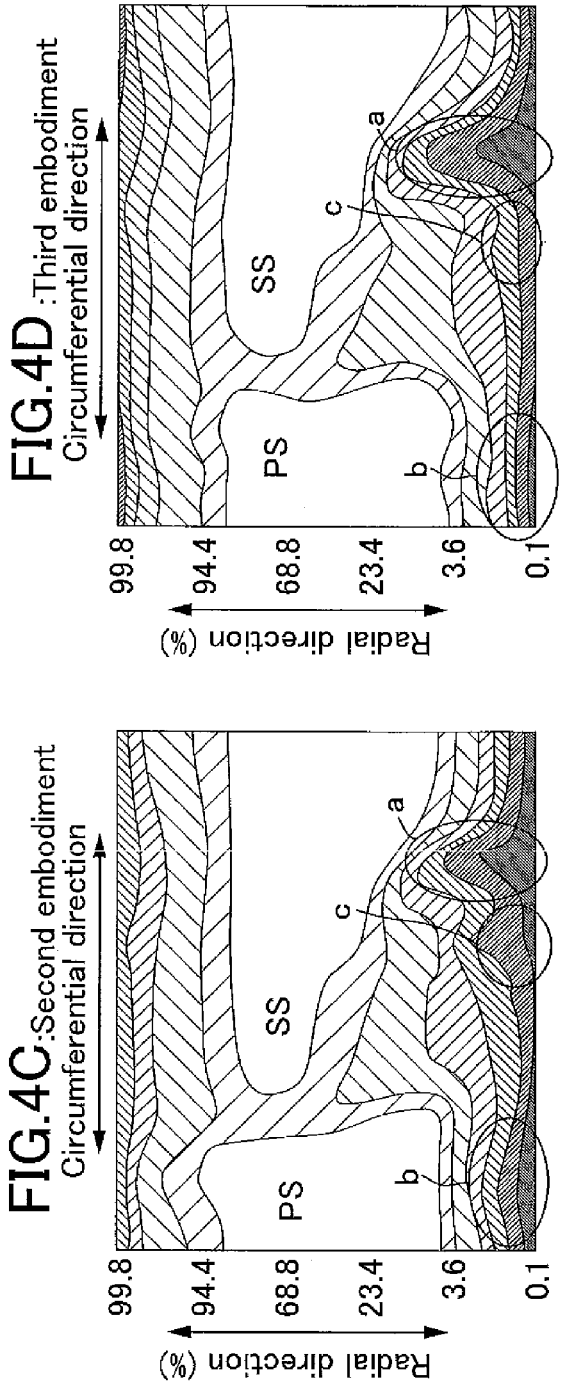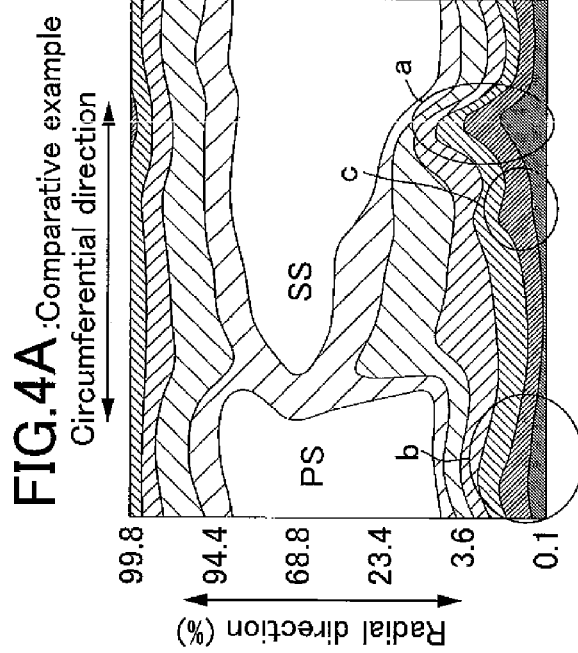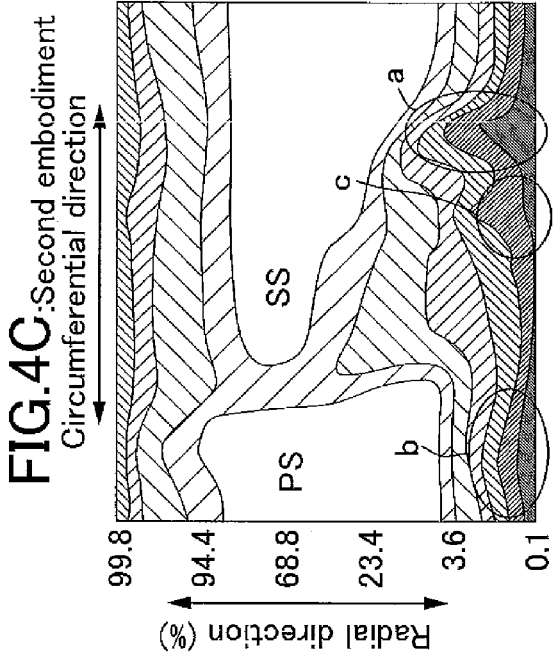

Third embodiment

Comparative example

SHAPE OF GAS PASSAGE IN AXIAL-FLOW GAS TURBINE ENGINE

CROSS-REFERENCE TO RELATED APPLICATIONS

The present application claims priority under 35 USC 119 to German Patent Application No. 102007020025.2 filed on Apr. 27, 2007 the entire contents of which are hereby incorporated by reference.

BACKGROUND OF THE INVENTION

1. Field of the Invention

The present invention relates to a shape of a gas passage in an axial-flow gas turbine engine in which a plurality of inlet guide vanes are radially disposed in an annular gas passage defined between an inner peripheral wall and an outer peripheral wail.

2. Description of Background Art

At present, the shapes of the inner peripheral wall and the outer peripheral wall of the gas passage of the inlet guide vanes adopted in the turbines of axial-flow gas turbine engine for an aircraft are mainly cylindrical shapes or conical shapes each formed by a generating line comprising a straight line, in large-sized or medium-sized engines. Also, as a modified shape of the conical shape, there exists a shape formed by an S-shaped generating line having a single inflection point. In small-sized engines, the shape of the outer peripheral wall does not differ from that of large-sized or medium-sized engines, but as for the shapes of the inner peripheral walls, a simple cylindrical shape is generally adopted because the inner peripheral wall is low in design freedom degree since they are small in size.

U.S. Pat. No. 6,283,713 discloses a gas turbine in which the shape of an end wall 33 of a platform 31 constituting the hub of a turbine blade 29 is made to differ at a side of a suction surface 34 and at a side of a pressure surface 35 of the turbine blade 29, thereby reducing the pressure gradient between the adjacent turbine blades 29 to delay the occurrence of vortex and pressure loss.

U.S. Pat. No. 6,669,445 discloses a flow directing assembly in which the surface shape of a platform 16 supporting the inner end in a radial direction of a blade 12 or a vane 12 of a compressor or a turbine of a gas turbine engine is bulged outwardly in the radial direction at a portion in contact with the blade 12 or the vane 12, and is recessed inward in the radial direction at an intermediate portion in the circumferential direction, thereby reducing a shock wave in a transonic region.

U.S. Pat. No. 6,561,761 discloses a compressor flow path in which a flute 40 extending in a gas flow direction is formed in the region sandwiched by adjacent blades 16 in a platform 38 constituting the inner peripheral wall of the blade 16 of the compressor of a gas turbine engine and a shroud 36 constituting the outer peripheral wall, thereby expanding the gas passage to improve efficiency of the compressor.

U.S. Pat. No. 5,466,123 discloses a gas turbine engine in which convex portions and concave portions continuing in the circumferential direction are formed on the inner platform 27 of the nozzle guide vane 20 of a turbine, thereby making uniform distribution in the circumferential direction at the downstream of the nozzle guide vane 20.

It is known that the pressure loss in the inlet guide vane of a turbine of a turbine engine occurs because a secondary flow from a tip toward a hub side occurs due to a pressure difference in the span direction in the suction surface of the inlet guide vane. Thus, the exit flow angle of gas from the trailing edge becomes ununiform in the span direction to reduce the efficiency of the turbine on its rear-stage.

SUMMARY AND OBJECTS OF THE INVENTION

The present invention has been achieved in view of the aforementioned circumstances. It is an object of an embodiment of the present invention to provide a shape of a gas passage for reducing pressure loss due to a secondary flow of an inlet guide vane of a turbine in an axial-flow gas turbine engine.

In order to achieve the above object of an embodiment of the present invention, there is provided a shape of a gas passage in an axial-flow gas turbine engine in which a plurality of inlet guide vanes are radially disposed in an annular gas passage defined between an inner peripheral wall and an outer peripheral wall. In this shape, the inner peripheral wall between a leading edge and a trailing edge of the inlet guide vane comprises an inner peripheral concave portion curved into a concave shape in a radial direction on an upstream side of a fluid flow direction. An inner peripheral convex portion is curved into a convex shape in the radial direction on a downstream side of the fluid flow direction. In addition, the inner peripheral convex portion is positioned on the outer side in the radial direction with respect to a reference line connecting inner ends in the radial direction of the leading edge and the trailing edge of the inlet guide vane.

According to a second feature of an embodiment of the present invention, there is provided a shape of a gas passage in an axial-flow gas turbine engine in which a plurality of inlet guide vanes are radially disposed in an annular gas passage defined between an inner peripheral wall and an outer peripheral wall. In this shape, the outer peripheral wall between a leading edge and a trailing edge of the inlet guide vane comprises an outer peripheral convex portion curved into a convex shape in a radial direction on an upstream side of a fluid flow direction and an outer peripheral concave portion curved into a concave shape in the radial direction on a downstream side of the fluid flow direction.

According to a third feature of an embodiment of the present invention, there is provided a shape of a gas passage in an axial-flow gas turbine engine in which a plurality of inlet guide vanes are radially disposed in an annular gas passage defined between an inner peripheral wall and an outer peripheral wall. In this shape, the inner peripheral wall between a leading edge and a trailing edge of the inlet guide vane comprises an inner peripheral concave portion curved into a concave shape in a radial direction on an upstream side of a fluid flow direction and an inner peripheral convex portion curved into a convex shape in the radial direction on a downstream side of the fluid flow direction. In addition, the inner peripheral convex portion is positioned on the outer side in the radial direction with respect to a reference line connecting inner ends in the radial direction of the leading edge and the trailing edge of the inlet guide vane. Further, the outer peripheral wall between the leading edge and the trailing edge of the inlet guide vane comprises an outer peripheral convex portion curved into a convex shape in a radial direction on an upstream side of the fluid flow direction and an outer peripheral concave portion curved into a concave shape in the radial direction on a downstream side of the fluid flow direction.

According to a fourth feature of an embodiment of the present invention, the inner peripheral wall has three inflection points.

According to a fifth feature of an embodiment of the present invention, the inner peripheral wall has one inflection point in a range from the leading edge to a 50% chord position, and has two inflection points in a range from the 50% chord position to the trailing edge.

According to a sixth feature of an embodiment of the present invention, the outer peripheral wall has three or more inflection points.

According to a seventh feature of an embodiment of the present invention, the outer peripheral wall has two inflection points in a range from the leading edge to a 50% chord position, and has one or more inflection points in a range from the 50% chord position to the trailing edge.

According to a eighth feature of an embodiment of the present invention, there is provided a shape of a gas passage in an axial-flow gas turbine engine in which a plurality of inlet guide vanes are radially disposed in an annular gas passage defined between an inner peripheral wall and an outer peripheral wall. In this shape, a height in a radial direction of the gas passage between the inner peripheral wall and the outer peripheral wall has at least one maximum value and has at least one minimum value on a downstream side in a fluid flow direction from a position of the maximum value.

According to a ninth feature of an embodiment of the present invention, the outer peripheral wall between a leading edge and a trailing edge of the inlet guide vane comprises an outer peripheral convex portion curved into a convex shape in a radial direction on an upstream side in the fluid flow direction and an outer peripheral concave portion curved into a concave shape in the radial direction on a downstream side of the fluid flow direction, and a minimum value, which differs from the at least one minimum value, occurs in the outer peripheral convex portion.

With the first feature corresponding to a first embodiment of the present invention, an inner peripheral concave portion on an upstream side which is curved into a concave shape in a radial direction, and an inner peripheral convex portion on a downstream side which is curved into a convex shape in the radial direction are provided in the inner peripheral wall of the inlet guide vane. The inner peripheral convex portion is positioned on the outer side in the radial direction with respect to a reference line connecting inner ends in the radial direction of the leading edge and the trailing edge of the inlet guide vane.

According to the second feature corresponding to a second embodiment of the present invention, an outer peripheral convex portion on the upstream side which is curved into a convex shape in a radial direction, and an outer peripheral concave portion on the downstream side which is curved into a concave shape in the radial direction are provided in the outer peripheral wall of the inlet guide vane. The third feature corresponding to a third embodiment of the present invention has the above-described first and second features.

According to the eighth feature corresponding to a first to the third embodiments of the present invention, the height in the radial direction of the annular gas passage defined between the inner peripheral wall and the outer peripheral wall of the inlet guide vane has a maximum value on the upstream side in the fluid flow direction and a minimum value on the downstream side in the fluid flow direction.

With these arrangements, the pressure difference in the span direction in the upstream side portion of the inner peripheral wall or the outer peripheral wall of the inlet guide vane is reduced or partially reversed, the secondary flow in the radial direction from the tip side toward the hub side of the inlet guide vane is suppressed to reduce pressure loss, and the gas flow flowing into the rear-stage of the turbine can be made uniform. The maximum load position in which the pressure difference between the suction surface and the pressure surface of the inlet guide vane becomes maximum is shifted to the trailing edge side, whereby the secondary flow in the circumferential direction from the pressure surface toward the suction surface between the inlet guide vanes adjacent in the circumferential direction is suppressed, thereby making uniform the flow of the gas flowing into the rear-stage turbine.

The above described effect is exhibited by only optimization of the shape of the inner peripheral wall, or only optimization of the shape of the outer peripheral wall, but is more effectively exhibited by optimizing the shape of the inner peripheral wall and the shape of the outer peripheral wall at the same time.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 3A to 3D are diagrams showing distributions of Mach numbers with respect to axial chords of the comparative example and the first to third embodiments;

FIGS. 4A to 4D are diagrams showing distributions of pressure loss in a span direction and a circumferential direction of the comparative example and the first to the third embodiments;

DETAILED DESCRIPTION OF THE PREFERRED EMBODIMENTS

Embodiments of the present invention will now be described based on the attached drawings.

Figure 1:
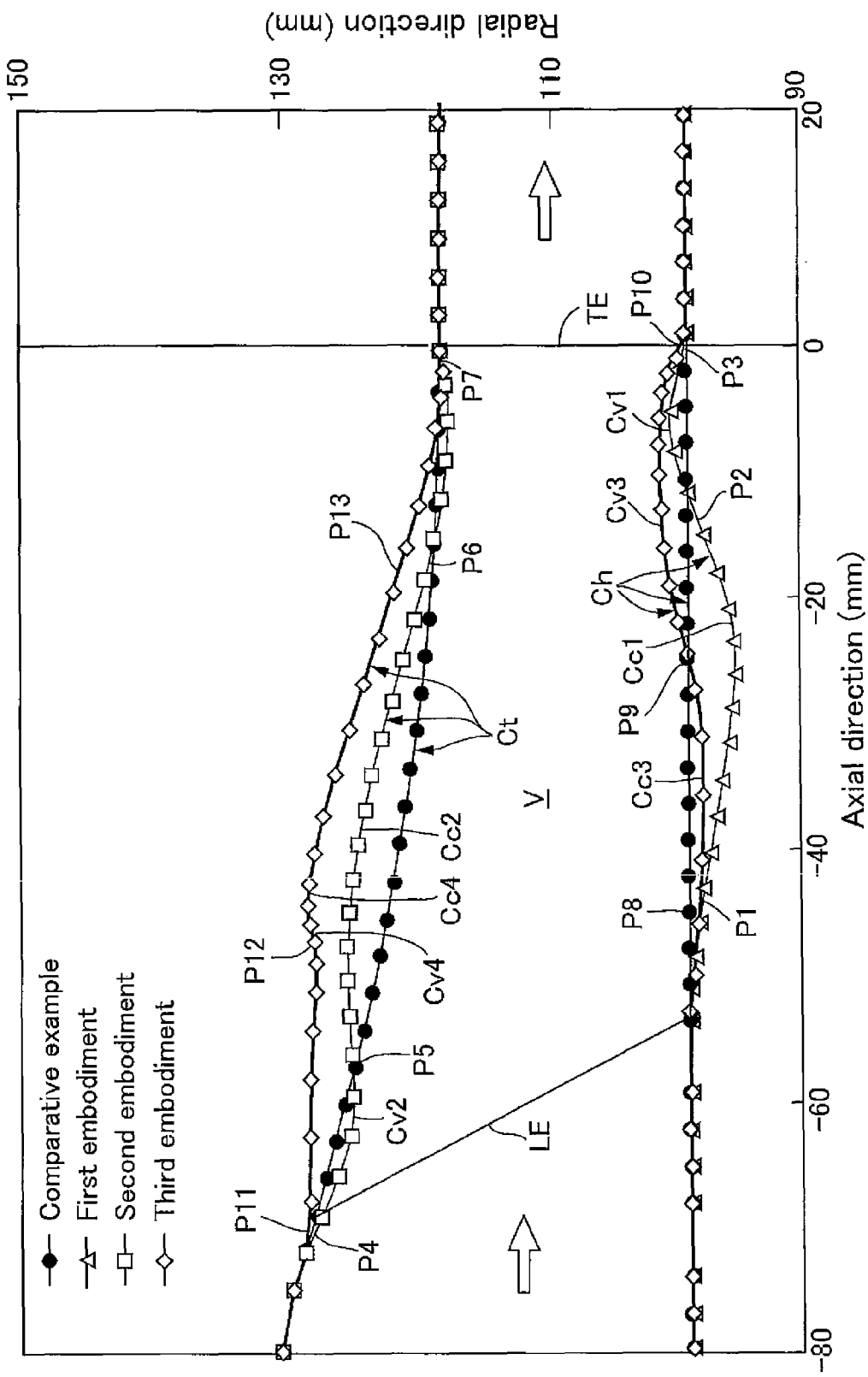
FIG. 1 is a diagram showing shapes of gas passages of inlet guide vanes of a comparative example and first to third embodiments.

FIG. 1 shows the shapes of an inner peripheral wall Ch and an outer peripheral wall Ct of an inlet guide vane V disposed at an inlet of a turbine in a gas turbine engine. A reference symbol LE represents a leading edge of the inlet guide vane V, and a reference symbol TE represents a trailing edge of the inlet guide vane V. The inlet guide vane V has an ultra-low aspect ratio where a chord length (length in the axial direction) is larger than a span length (length in the radial direction). The leading edge LE extends to be inclined to an upstream side in a gas flow direction at a tip side (outer side in the radial direction) with respect to a hub side (inner side in the radial direction). The trailing edge TE extends in a direction orthogonal to the gas flow direction on both the hub side and the tip side.

The line with the black circles shows a comparative example, in which the inner peripheral wall Ch on the hub side is formed into a straight line (constant diameter) along the gas flow direction, whereas the outer peripheral wall Ct on the tip side decreases in diameter monotonously and smoothly from the upstream side toward the downstream side in the gas flow direction. The shape (straight line) of the inner peripheral wall Ch of the comparative example will be called a reference line.

The line with triangles shows a first embodiment in which optimization of the inner peripheral wall Ch is performed, and the shape of the outer peripheral wall Ct is the same as that of the comparative example (see the line with the black circles) In the shape of the inner peripheral wall Ch of the first embodiment, a large inner peripheral concave portion Cc1 which curves to an inner side in the radial direction from the reference line is formed in a region from the leading edge LE of the inlet guide vane V up to the vicinity of a 80% position of the axial chord. A small inner peripheral convex portion Cv1 which is curved to an outer side in the radial direction from the reference line is formed in the region from the vicinity of the 80% position of the axial chord to the trailing edge TE. The inner peripheral wall Ch of the first embodiment includes, in the range from the leading edge LE to the trailing edge TE, toward the outer peripheral wall Ct, a first inflection point P1 at which the curvature is changed from convex to concave, a second inflection point P2 at which the curvature is changed from concave to convex, and a third inflection point P3 at which the curvature is changed from convex to concave.

The line with squares shows a second embodiment in which optimization of the outer peripheral wall Ct is performed. The shape of the inner peripheral wall Ch is the same as that of the comparative example (see the line with the black circles). In the shape of the outer peripheral wall Ct of the second embodiment, an outer peripheral convex portion Cv2 which is curved to the inner side in the radial direction is formed immediately after the leading edge LE. On the downstream side of this, an outer peripheral concave portion Cc2, which is curved to the outer side in the radial direction, is formed thereby forming the wall surface which is curved into an S-shape. On the downstream side of this, the sectional area of the gas passage is gradually reduced toward the trailing edge TE. The outer peripheral wall Ct of the second embodiment includes, in the region from the leading edge LE to the trailing edge TE, toward the inner peripheral wall Ch, a first inflection point P4 at which the curvature is changed from concave to convex, a second inflection point P5 at which the curvature is changed from convex to concave, a third inflection point P6 at which the curvature is changed from concave to convex, and a fourth inflection point P7 at which the curvature is changed to concave from convex.

The line with diamonds shows a third embodiment in which optimization of the inner peripheral wall Ch and optimization of the outer peripheral wall Ct are performed at the same time. The shape of the inner peripheral wall Ch is similar to the shape of the inner peripheral wall Ch of the first embodiment. However, an inner peripheral concave portion Cc3 of the third embodiment is shifted to the upstream side from the inner peripheral concave portion Cc1 of the first embodiment to reduce the degree of the recess, and an inner peripheral convex portion Cv3 of the third embodiment is shifted to the upstream side from the inner peripheral convex portion Cv1 of the first embodiment to increase the degree of the bulge. The inner peripheral wall Ch of the third embodiment includes, in the region from the leading edge LE to the trailing edge TE, toward the outer peripheral wall Ct, a first inflection point P8 at which the curvature is changed from convex to concave, a second inflection point P9 at which the curvature is changed from concave to convex, and a third inflection point P10 at which the curvature is changed from convex to concave.

The shape of the outer peripheral wall Ct of the third embodiment is similar to the shape of the outer peripheral wall Ct of the second embodiment. However, a portion with a substantially constant diameter continues on the downstream side of the leading edge LE. Therefore, an outer peripheral convex portion Cv4 of the third embodiment is shifted to the downstream side and to the outer side in the radial direction from the outer peripheral convex portion Cv2 of the second embodiment, thereby reducing the degree of the bulge. An outer peripheral concave portion Cc4 of the third embodiment is shifted to the outer side in the radial direction from the outer peripheral concave portion Cc2 of the second embodiment. In addition, on the downstream side of the outer peripheral concave portion Cc4, the sectional area of the gas passage is gradually reduced toward the trailing edge TE. The outer peripheral wall Ct of the third embodiment includes, in the region from the leading edge LE to the trailing edge TE, toward the inner peripheral wall Ch, a first inflection point P11 at which the curvature is changed from convex to concave, a second inflection point P12 at which the curvature is changed from convex to concave, and a third inflection point P13 at which the curvature is changed from concave to convex.

In the first embodiment, the one inflection point P1 exists in the region from the leading edge LE of the inner peripheral wall Ch to the 50% chord position, and the two inflection points P2 and P3 exist in the region from the 50% chord position to the trailing edge TE.

In the second embodiment, the two inflection points P4 and P5 exist in the region from the leading edge LE of the outer peripheral wall Ct to the 50% chord position, and the two inflection points P6 and P7 exist in the region from the 50% chord position to the trailing edge TE.

In the third embodiment, the one inflection point P8 exists in the region from the leading edge LE of the inner peripheral wall Ch to the 50% chord position, and the two inflection points P9 and P10 exist in the region from the 50% chord position to the trailing edge TE. The two inflection points P11 and P12 exist in the region from the leading edge LE of the outer peripheral wall Ct to the 50% chord position, and the one inflection point P13 exists in the region from the 50% chord position to the trailing edge TE.

Figure 2:
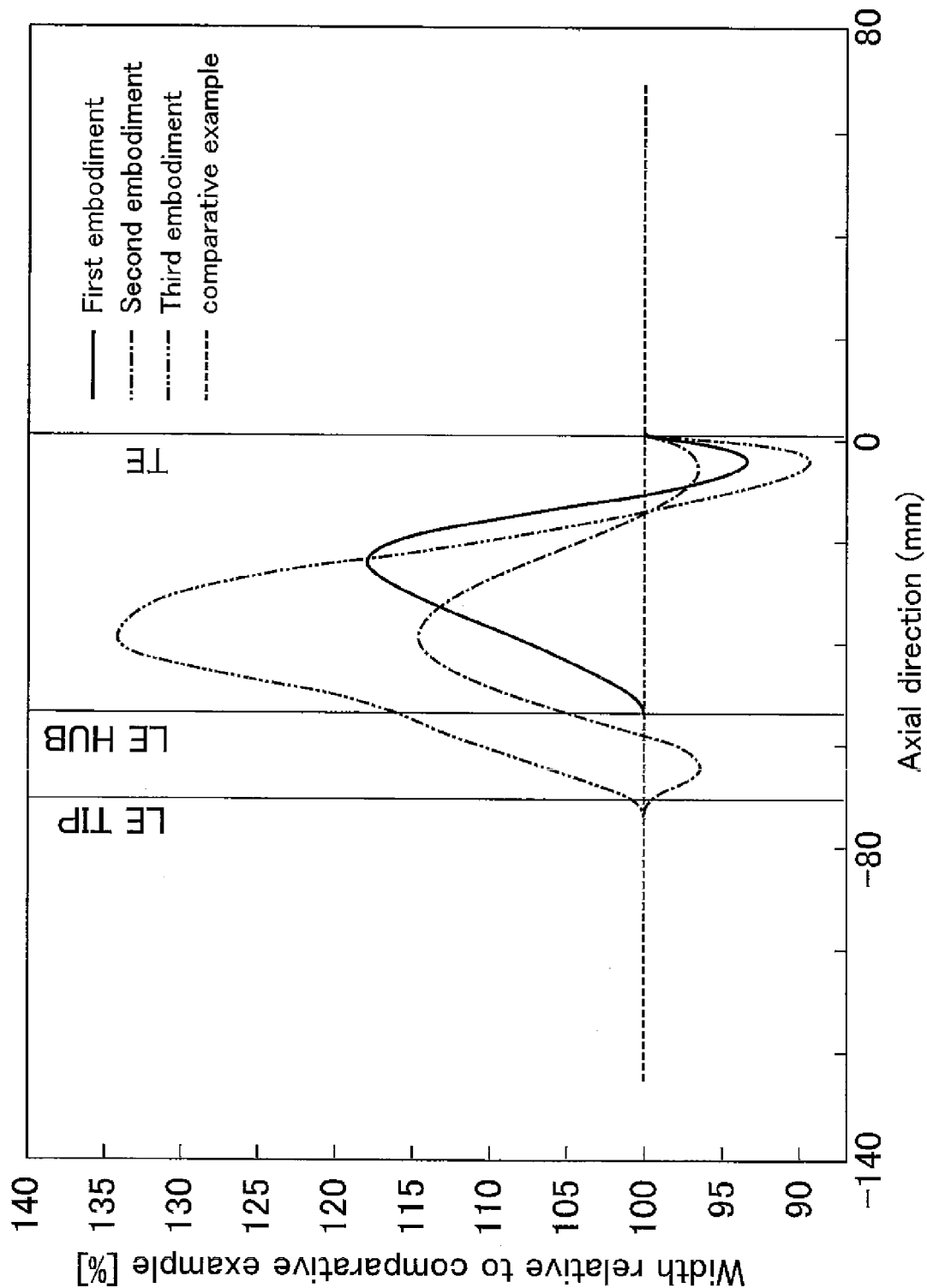
FIG. 2 is a diagram showing distributions of heights in a radial direction of the gas passages of the inlet guide vanes of the comparative example and the first to the third embodiments.

FIG. 2 shows the distribution in the chord direction of the height in the radial direction of the gas passage between the inner peripheral wall Ch and the outer peripheral wall Ct of the inlet guide vane V. FIG. 2 is made dimensionless by the height in the radial direction of the gas passage of the comparative example.

In the first embodiment in which optimization of the inner peripheral wall Ch is performed, from the leading edge LE side toward the trailing edge TE side, the height in the radial direction of the gas passage increases from 100 that is the reference value to reach the maximum value, then decreases to reach the minimum value below 100, and thereafter increases again to return to 100.

The second embodiment in which optimization of the outer peripheral wall Ct is performed basically has the same characteristics as those of the first embodiment, but it is characterized in that the height in the radial direction of the gas passage once decreases from the reference value 100 immediately after the leading edge LE, and forms the second minimum value different from the above described minimum value.

The third embodiment in which optimization of the inner peripheral wall Ch and optimization of the outer peripheral wall Ct are performed at the same time has the same characteristics as those of the first embodiment, but the maximum value is larger than that of the first embodiment and the minimum value is smaller than that of the first embodiment, resulting in that the difference between the maximum value and the minimum value increases more than in the first embodiment.

The characteristic common to the first to the third embodiments is that the load of the inlet guide vane V is moved to the trailing edge TE side, as compared with the comparative example, by temporarily extending the height in the radial direction of the gas passage defined by the inner peripheral wall Ch and the outer peripheral wall Ct from the upstream portion to the middle portion, and thereafter rapidly reducing the height toward the downstream portion.

The large factor which causes the pressure loss in the inlet guide vane V is the occurrence of the secondary flow toward the hub side (inner peripheral wall Ch side) from the tip side (outer peripheral wall Ct side) of the inlet guide vane V due to the pressure difference in the span direction in the suction surface of the inlet guide vane V. This is because when such a secondary flow inward in the radial direction occurs, the exit flow angle of the gas from the trailing edge of the inlet guide vane V becomes ununiform in the span direction, and the efficiency of the turbine on the rear side is reduced.

FIG. 3A is a graph showing the distribution of a Mach number with respect to the axial chord of the comparative example, wherein the three lines respectively correspond to the 10% position, 50% position and 90% position in the span direction from the inner peripheral wall Ch side. The three lines on the lower side correspond to the pressure surface of the inlet guide vane V, whereas the three lines on the upper side correspond to the suction surface of the inlet guide vane V. The factor of the occurrence of the secondary flow inward in the radial direction is read from the pressure gradient of the suction surface. Namely, it is considered that in a region a near the leading edge LE of the inlet guide vane V, the Mach number becomes higher and the pressure becomes lower toward the inner peripheral wall Ch side in the span direction. As a result secondary flow occurs towards the inner peripheral wall Ch side which is at a low pressure from the outer peripheral wall Ct side which is at a high pressure.

FIG. 3B shows the first embodiment in which optimization of the inner peripheral wall Ch is performed. It is considered that the pressure distribution in the span direction is reversed in a region b downstream of the region a, the Mach number becomes smaller toward the inner peripheral wall Ch side in the span direction to raise the pressure. As a result the secondary flow in the radial direction toward the inner peripheral wall Ch side from the outer peripheral wall Ct side is suppressed to reduce pressure loss. In the comparative example in FIG. 3A, the position (maximum load position) at which the Mach number difference between the pressure surface and the suction surface of the inlet guide vane V becomes maximum is the 65% chord position, but in the first embodiment of FIG. 3B, the maximum load position is shifted to the 70% chord position on a further downstream side. Therefore, it is considered that the secondary flow in the circumferential direction advancing from the pressure surface to the suction surface between the adjacent inlet guide vanes V is suppressed, which contributes to the reduction in pressure loss, in cooperation with the reduction in the above-described secondary flow inward in the radial direction.

FIG. 3C shows the second embodiment in which optimization of the outer peripheral wall Ct is performed. FIG. 3D shows the third embodiment in which optimization of the inner peripheral wall Ch and optimization of the outer peripheral wall Ct are performed at the same time. In the second and third embodiments, the reverse phenomenon of the pressure gradient in the span direction in the region b of the first embodiment of FIG. 3B is not observed, but it is considered that the pressure gradient in the span direction in the region a becomes small as compared with the comparative example in FIG. 3A, thereby suppressing the secondary flow in the radial direction. In addition, the maximum load position, at which the Mach number difference between the pressure surface and the suction surface becomes maximum, is shifted to the downstream side as compared with the comparative example, thereby suppressing the secondary flow in the circumferential direction to contribute to the reduction in pressure loss.

FIGS. 4A to 4D are graphs showing the loss distribution in the span direction and the circumferential direction of the gas passage taken from the downstream side to the upstream side. FIG. 4A corresponds to the comparative example. FIGS. 4B to 4D correspond to the first to the third embodiments, respectively. A darker portion in the drawings shows a larger pressure loss. The pressure loss is large in the vicinity of the inner peripheral wall Ch of the inlet guide vane V and in the vicinity of the outer peripheral wall Ct, particularly in the vicinity of the inner peripheral wall Ch.

In comparison between the comparative example and the first to the third embodiments, a large difference is not recognized in the loss distribution on the outer peripheral wall Ct side, but a difference is recognized in the loss distribution on the inner peripheral wall Ch side. Namely, in the region a, the loss of the first to the third embodiments slightly increases as compared with the comparative example, but in the region b and the region c, the loss of the first to the third embodiments decreases as compared with the comparative example. Thus, the total loss of the first to the third embodiments is considered to be less than the total loss of the comparative example.

Figure 5B:
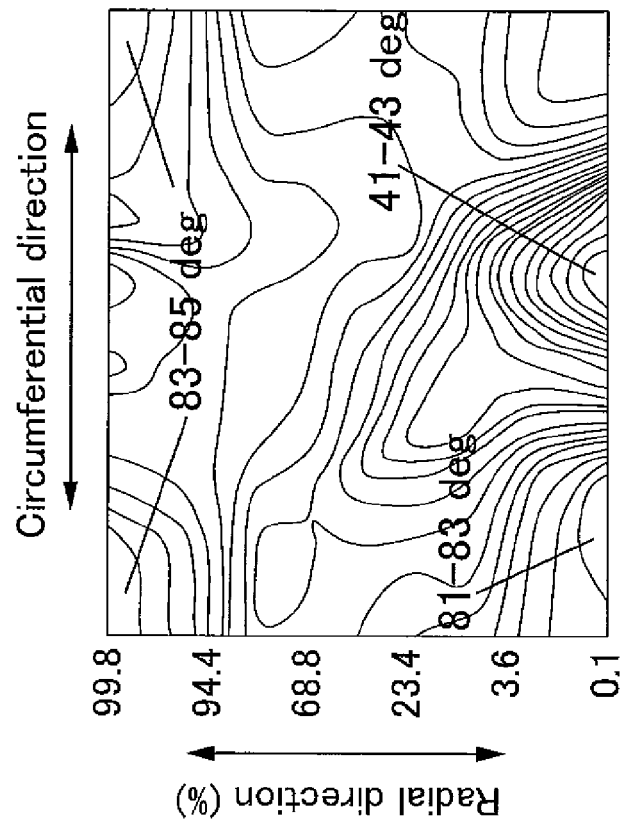
FIGS. 5A and 5B are diagrams showing distributions of exit flow angles in the span direction and the circumferential direction of the comparative example and the third embodiment.
Figure 5A:
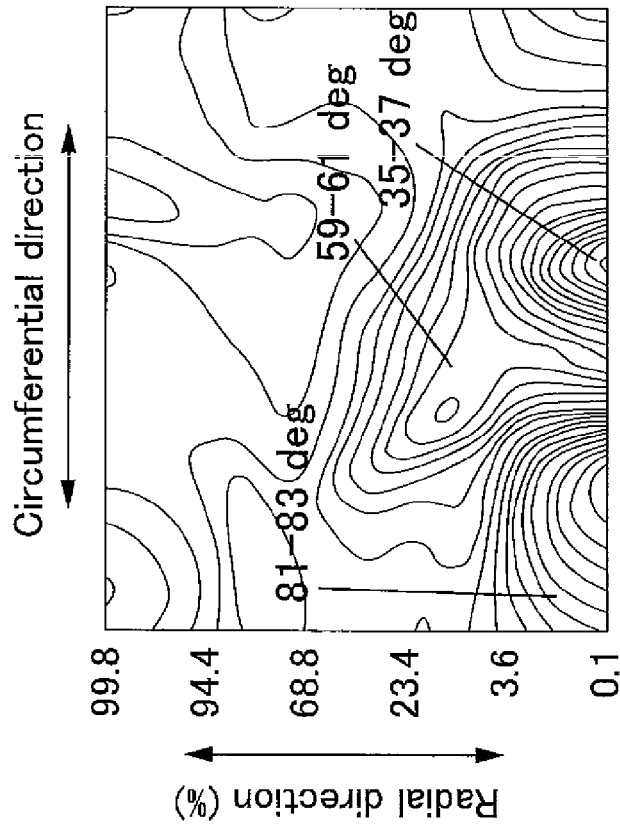

FIGS. 5A and 5B are graphs showing the exit flow angle distributions in the span direction and the circumferential direction of the gas passage taken from the downstream side to the upstream side. FIG. 5A corresponds to the comparative example, and FIG. 5B corresponds to the third embodiment. The numerals in these drawings indicate values of the exit flow angle.

In the comparative example, portions in which the exit flow angle is rapidly changed, that is, two cores due to the existence of the vortex exist in the vicinity of the inner peripheral wall Ch. However, in the third embodiment it is observed that the core at the left side in the drawing becomes weak and substantially disappears. Thus, the distribution of the exit flow angle in the circumferential direction is made more uniform. It is considered that by uniformity of the exit flow angle, the characteristic of the flow at the entrance of the turbine on the downstream side of the inlet guide vane V is improved to reduce loss.

Figure 6:
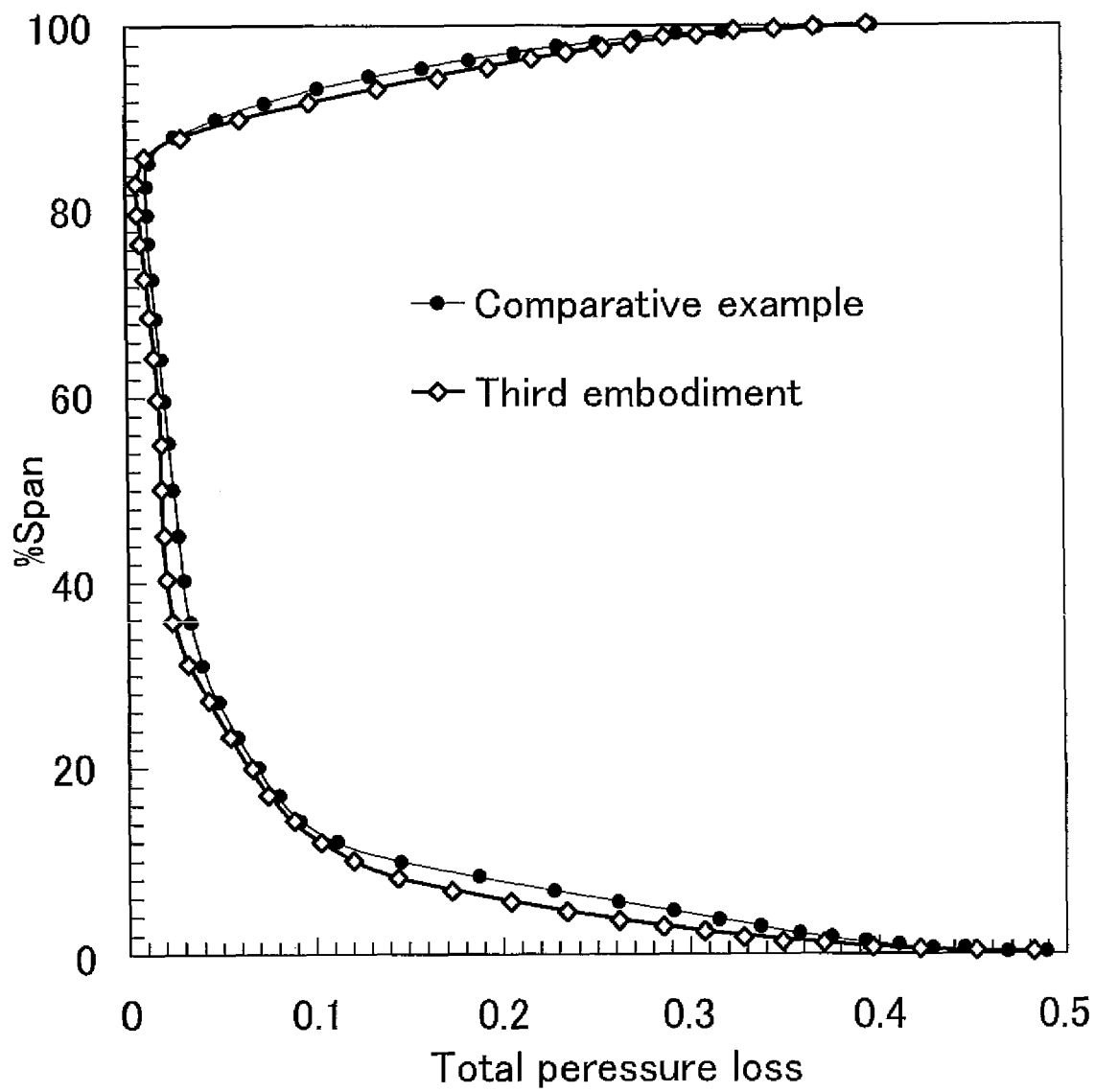
FIG. 6 is a diagram showing distributions of pressure loss in the span direction of the comparative example and the third embodiment.

FIG. 6 is a graph showing the distribution of the pressure loss along the span direction of the inlet guide vane V. The line with the black circles corresponds to the comparative example, and the line with the diamonds corresponds to the third embodiment in which optimization of the inner peripheral wall Ch and optimization of the outer peripheral wall Ct are performed at the same time. The pressure loss of the third embodiment is less than the pressure loss of the comparative example in the region from the 0% span position (inner peripheral wall Ch) to an 87% span position. In the remaining part of the region, that is, the region from the 87% span position to the 100% span position (outer peripheral wall Ct), the pressure loss of the third embodiment exceeds the pressure loss of the comparative example. However, it is observed that the pressure loss of the third embodiment is less than the pressure loss of the comparative example as a whole.

Figure 7:
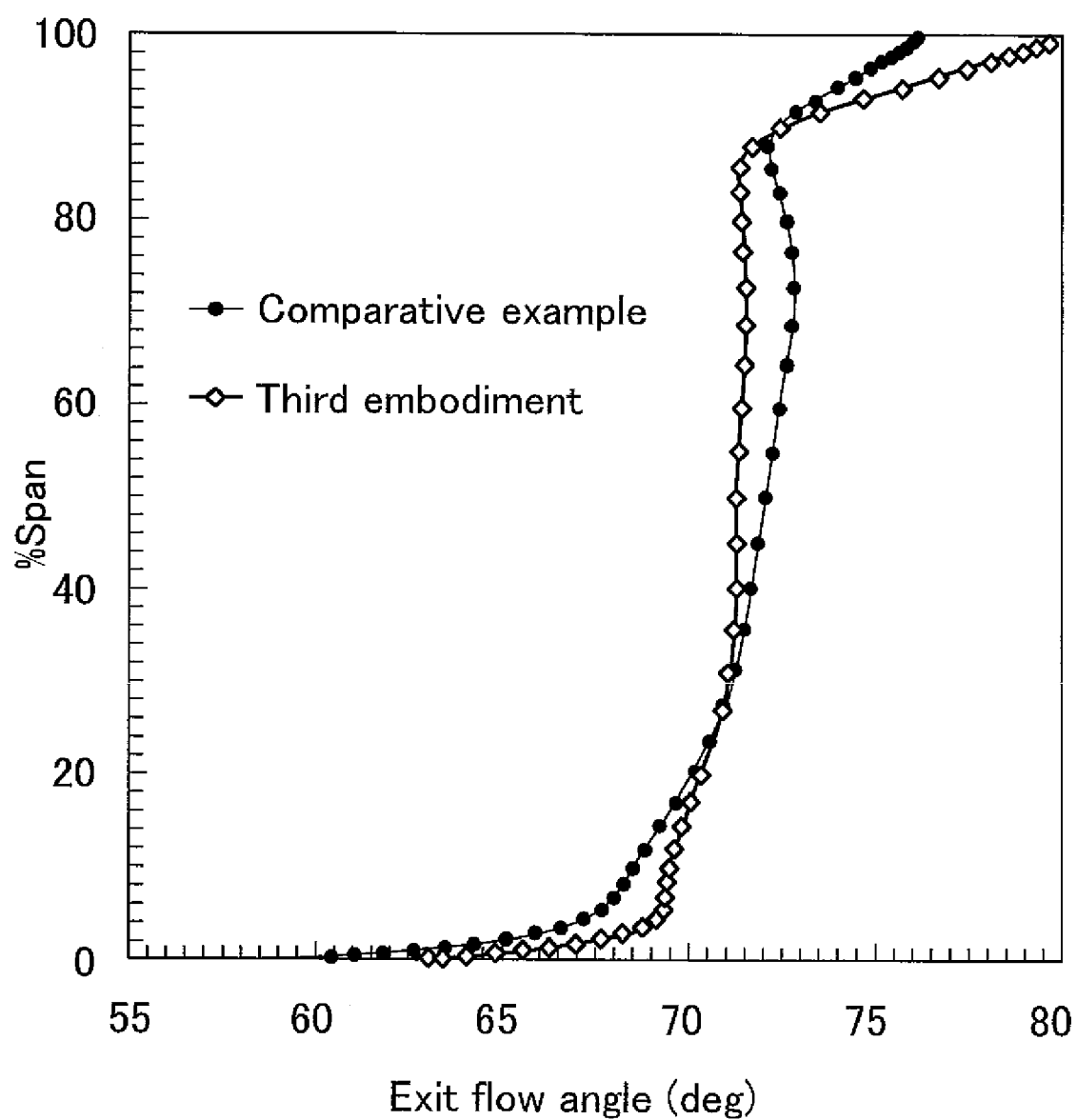
FIG. 7 is a diagram showing distributions of exit flow angles in the span direction of the comparative example and the third embodiment.

FIG. 7 is a graph showing the distribution of the exit flow angle along the span direction of the inlet guide vane V. The line with the black circles corresponds to the comparative example, and the line with the diamonds corresponds to the third embodiment in which optimization of the inner peripheral wall Ch and optimization of the outer peripheral wall Ct are performed at the same time. As compared with the comparative example, in the third embodiment, the exit flow angle is kept substantially constant in the wide region in the span direction including the region from the 0% span position (inner peripheral wall Ch) to the 25% span position, thereby improving efficiency of the turbine on the rear stage of the inlet guide vane V.

Thus, when the pressure loss of the comparative example is set as 100, the pressure loss of the first embodiment (optimization of the inner peripheral wall Ch) is improved by 5% up to 95%, the pressure loss of the second embodiment (optimization of the outer peripheral wall Ct) is improved by 6% up to 94%, and the pressure loss of the third embodiment (optimization of the inner peripheral wall Ch and optimization of the outer peripheral wall Ct) is improved by 10% up to 90%.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shape of a gas passage in an axial-flow gas turbine engine in which a plurality of inlet guide vanes (V) are radially disposed in an annular gas passage defined between an inner peripheral wall (Ch) and an outer peripheral wall (Ct), comprising:
said inner peripheral wall (Ch) between a leading edge (LE) and a trailing edge (TE) of the inlet guide vane (V) comprises:
an inner peripheral concave portion (Cc1) curved into a concave shape in a radial direction on an upstream side of a fluid flow direction; and
an inner peripheral convex portion (Cv1) curved into a convex shape in the radial direction on a downstream side of the fluid flow direction; and
said inner peripheral convex portion (Cv1) is positioned on the outer side in the radial direction with respect to a reference line connecting inner ends in the radial direction of the leading edge (LE) and the trailing edge (TE) of the inlet guide vane (V);
wherein each of said plurality of inlet guide vanes (V) includes a chord length in an axial direction that is larger relative to a span length in the radial direction with the leading edge being inclined to the upstream side at a tip side, outer side in the radial direction, as compared to the hub side, inner side in the radial direction.

2. The shape of a gas passage in an axial-flow gas turbine engine according to claim 1, wherein the inner peripheral wall (Ch) has three inflection points.

3. The shape of a gas passage in an axial-flow gas turbine engine according to claim 2, wherein the inner peripheral wall (Ch) has one inflection point in a range from the leading edge (LE) to a 50% chord position, and has two inflection points in a range from the 50% chord position to the trailing edge (TE).

4. A shape of a gas passage in an axial-flow gas turbine engine in which a plurality of inlet guide vanes (V) are radially disposed in an annular gas passage defined between an inner peripheral wall (Ch) and an outer peripheral wall (Ct), comprising:
said outer peripheral wall (Ct) between a leading edge (LE) and a trailing edge (TE) of the inlet guide vane (V) comprises:
an outer peripheral convex portion (Cv2) curved into a convex shape in a radial direction on an upstream side of a fluid flow direction; and
an outer peripheral concave portion (Cc2) curved into a concave shape in the radial direction on a downstream side of the fluid flow direction);
wherein each of said plurality of inlet guide vanes (V) includes a chord length in an axial direction that is larger relative to a span length in the radial direction with the leading edge being inclined to the upstream side at a tip side, outer side in the radial direction, as compared to the hub side, inner side in the radial direction.

5. The shape of a gas passage in an axial-flow gas turbine engine according to claim 4, wherein the inner peripheral wall (Ch) has three inflection points.

6. The shape of a gas passage in an axial-flow gas turbine engine according to claim 5, wherein the inner peripheral wall (Ch) has one inflection point in a range from the leading edge (LE) to a 50% chord position, and has two inflection points in a range from the 50% chord position to the trailing edge (TE).

7. The shape of a gas passage in an axial-flow gas turbine engine according to claim 4, wherein the outer peripheral wall (Ct) has three or more inflection points.

8. The shape of a gas passage in an axial-flow gas turbine engine according to claim 7, wherein the outer peripheral wall (Ct) has two inflection points in a range from the leading edge (LE) to a 50% chord position, and has one or more inflection points in a range from the 50% chord position to the trailing edge (TE).

9. A shape of a gas passage in an axial-flow gas turbine engine in which a plurality of inlet guide vanes (V) are radially disposed in an annular gas passage defined between an inner peripheral wall (Ch) and an outer peripheral wall (Ct), comprising:
said inner peripheral wall (Ch) between a leading edge (LE) and a trailing edge (TE) of the inlet guide vane (V) comprises:
an inner peripheral concave portion (Cc3) curved into a concave shape in a radial direction on an upstream side of a fluid flow direction; and
an inner peripheral convex portion (Cv3) curved into a convex shape in the radial direction on a downstream side of the fluid flow direction;
said inner peripheral convex portion (Cv3) is positioned on the outer side in the radial direction with respect to a reference line connecting inner ends in the radial direction of the leading edge (LE) and the trailing edge (TE) of the inlet guide vane (V); and
said outer peripheral wall (Ct) between the leading edge (LE) and the trailing edge (TE) of the inlet guide vane (V) comprises:
an outer peripheral convex portion (Cv4) curved into a convex shape in a radial direction on an upstream side of the fluid flow direction; and an outer peripheral concave portion (Cc4) curved into a concave shape in the radial direction on a downstream side of the fluid flow direction);

wherein each of said plurality of inlet guide vanes (V) includes a chord length in an axial direction that is larger relative to a span length in the radial direction with the leading edge being inclined to the upstream side at a tip side, outer side in the radial direction, as compared to the hub side, inner side in the radial direction.

10. The shape of a gas passage in an axial-flow gas turbine engine according to claim 9, wherein the inner peripheral wall (Ch) has three inflection points.

11. The shape of a gas passage in an axial-flow gas turbine engine according to claim 10, wherein the inner peripheral wall (Ch) has one inflection point in a range from the leading edge (LE) to a 50% chord position, and has two inflection points in a range from the 50% chord position to the trailing edge (TE).

12. The shape of a gas passage in an axial-flow gas turbine engine according to claim 9, wherein the outer peripheral wall (Ct) has three or more inflection points.

13. The shape of a gas passage in an axial-flow gas turbine engine according to claim 12, wherein the outer peripheral wall (Ct) has two inflection points in a range from the leading edge (LE) to a 50% chord position, and has one or more inflection points in a range from the 50% chord position to the trailing edge (TE).

14. A shape of a gas passage in an axial-flow gas turbine engine in which a plurality of inlet guide vanes (V) are radially disposed in an annular gas passage defined between an inner peripheral wall (Ch) and an outer peripheral wall (Ct), comprising:

a height in a radial direction of the gas passage between the inner peripheral wall (Ch) and the outer peripheral wall (Ct) has at least one maximum value, and has at least one minimum value on a downstream side in a fluid flow direction from a position of the maximum value);

wherein each of said plurality of inlet guide vanes (V) includes a chord length in an axial direction that is larger relative to a span length in the radial direction with the leading edge being inclined to an upstream side at a tip side, outer side in the radial direction, as compared to the hub side, inner side in the radial direction.

15. The shape of a gas passage in an axial-flow gas turbine engine according to claim 14, wherein the outer peripheral wall (Ct) between a leading edge (LE) and a trailing edge (TE) of the inlet guide vane (V) comprises:

an outer peripheral convex portion (Cv2) curved into a convex shape in a radial direction on an upstream side in the fluid flow direction; and an outer peripheral concave portion (Cc2) curved into a concave shape in the radial direction on a downstream side of the fluid flow direction, and a minimum value, which is different from the at least one minimum value, occurs in the outer peripheral convex portion (Cv2).

* * * * *